United States Patent
Wesson

(10) Patent No.: US 9,648,025 B1
(45) Date of Patent: *May 9, 2017

(54) USING SPACE-FILLING CURVES TO FINGERPRINT DATA

(71) Applicant: Support Intelligence, Inc., San Francisco, CA (US)

(72) Inventor: Rick Holloman Wesson, Richmond, CA (US)

(73) Assignee: Support Intelligence, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/613,285

(22) Filed: Feb. 3, 2015

Related U.S. Application Data

(63) Continuation of application No. 14/288,285, filed on May 27, 2014, now Pat. No. 8,977,858.

(51) Int. Cl.
  *H04L 29/06* (2006.01)
  *H04L 9/32* (2006.01)
  *G06F 17/30* (2006.01)
  *G06F 21/56* (2013.01)

(52) U.S. Cl.
  CPC ........ *H04L 63/12* (2013.01); *G06F 17/30097* (2013.01); *G06F 21/561* (2013.01); *H04L 9/3242* (2013.01)

(58) Field of Classification Search
  None
  See application file for complete search history.

(56) References Cited

U.S. PATENT DOCUMENTS

| | | | | |
|---|---|---|---|---|
| 5,692,013 A | * | 11/1997 | Koslov | H04L 27/3854 329/304 |
| 6,215,408 B1 | * | 4/2001 | Leonard | G01R 31/3274 324/415 |
| 6,259,314 B1 | * | 7/2001 | Liu | H04L 1/24 329/304 |
| 8,270,559 B2 | * | 9/2012 | Chiang | G06T 11/006 378/4 |
| 8,351,643 B2 | * | 1/2013 | Radhakrishnan | G06F 17/30799 348/E5.067 |
| 2003/0110163 A1 | * | 6/2003 | Chen | G06F 17/30256 |
| 2008/0158396 A1 | * | 7/2008 | Fainstain | H04N 5/361 348/246 |
| 2009/0067736 A1 | * | 3/2009 | Payton | H04N 19/129 382/250 |
| 2009/0179999 A1 | * | 7/2009 | Albu | G06T 3/4053 348/222.1 |

(Continued)

OTHER PUBLICATIONS

Andrew Wilson, "Spatially Encoded Image-Space Simplifications for Interactive Walkthrough", 2002, pp. 314-323.*

(Continued)

*Primary Examiner* — Benjamin Lanier
(74) *Attorney, Agent, or Firm* — Van Pelt, Yi & James LLP

(57) ABSTRACT

A file is received. Contents of the file are transformed using a space-filling curve. One example of a space-filling curve that can be used for the transformation is a Hilbert curve. The result of the transformation is down-sampled. One example way of down-sampling is using a blur operation with anti-aliasing. A hashing operation is performed on the down-sampled result. One example of a hashing operation is locality sensitive hashing.

20 Claims, 15 Drawing Sheets

(56) References Cited

U.S. PATENT DOCUMENTS

| | | | |
|---|---|---|---|
| 2010/0021001 A1* | 1/2010 | Honsinger | G06T 1/0028 382/100 |
| 2010/0283779 A1* | 11/2010 | Chiang | G06T 11/006 345/419 |
| 2011/0026761 A1* | 2/2011 | Radhakrishnan | G06F 17/30799 382/100 |

OTHER PUBLICATIONS

Alexis Joly, "Statistical Similarity Search Applied to Content-Based Video Copy Detection", 2005, pp. 1-10.*
B. Irwin, "High Level Internet Scale Traffic Visualization Using Hilbert Curve Mapping", 2008, pp. 147-158.*

* cited by examiner

```
ctx = cl.create_some_context()
queue = cl.CommandQueue(ctx)

mf = cl.mem_flags
data_buf = cl.Buffer(ctx, mf.READ_ONLY | mf.COPY_HOST_PTR, hostbuf=pxe_data)
img_buf = cl.Buffer(ctx, mf.WRITE_ONLY, pxe_data.nbytes)

prg = cl.Program(ctx, """
    __kernel void hbert(const int h_order,
                       const int side,
        __global const unsigned char *data,
        __global unsigned char *image)
    {
            int gid = get_global_id(0);

int i;
            long state, x, y, row;

state = 0;                  /* Initialize. */
            x = y = 0;

for (i = 2 * h_order - 2; i >= 0; i -= 2) {     /* Do n times. */
                row = 4 * state | ((gid >> i) & 3);         /* Row in table. */
                x = (x << 1) | ((0x936C >> row) & 1);
                y = (y << 1) | ((0x39C6 >> row) & 1);
                state = (0x3E6B94C1 >> 2 * row) & 3;    /* New state. */
            } image[x+(side*y)] =  data[gid] ;
    }

""").build()
print "hOrder=", hOrder
print "side=", side
print "data.shape=", pxe_data.shape prg.hbert(queue, pxe_data.shape, None, np.int32(hOrder), np.int32(side), data_buf, img_buf)

img_result = np.empty_like(pxe_data);
cl.enqueue_copy(queue, img_result, img_buf)
```

FIG. 6

```
public static class HilbertKernel extends Kernel {
    private int order = 0;

@Constant
    byte[] h_data;
    private byte[] h_image;
    private int side=0;

public void setOrder(int value){
        this.order = value ;

} public HilbertKernel(int order, byte[] data, byte[] result) {
        this.order = order;
        this.h_data = data   ;
        this.side = (int) pow(2, order) ;
        this.h_image = result;
    }

@Override
    public void run() {
        int gid = getGlobalId();

int i;
        long state, x, y, row;

state = 0L;                   /* Initialize. */
        x = 0L;
        y = 0L;

for (i = 2 * order - 2; i >= 0; i -= 2) {        /* Do n times. */
            row = 4 * state | ((gid >> i) & 3  );         /* Row in table. */
            x = (x << 1) | ((0x936C >> row) & 1);
            y = (y << 1) | ((0x39C6 >> row) & 1);
            state = (0x3E6B94C1 >> 2 * row) & 3;    /* New state. */
        } h_image[(int)(x+(side*y))] = h_data[gid]   ;

USING SPACE-FILLING CURVES TO FINGERPRINT DATA

CROSS REFERENCE TO OTHER APPLICATIONS

This application is a continuation of co-pending U.S. patent application Ser. No. 14/288,285, entitled USING SPACE-FILLING CURVES TO FINGERPRINT DATA filed May 27, 2014 which is incorporated herein by reference for all purposes.

BACKGROUND OF THE INVENTION

Nefarious individuals seek to compromise computing systems for a variety of reasons. One way such compromises can be achieved is through the distribution of malicious software to target computers which then execute the malicious software. One way to help protect a computing system from compromise is to prevent malicious software from reaching it. As one example, computer security companies offer products that use blacklists of known malicious software to intercept malicious software or otherwise prevent it from ultimately executing on a computing system. Unfortunately, such blacklists have limitations. As one example, attackers can make subtle changes to existing malicious software (e.g., that is present on a blacklist) resulting in a version of the malicious software that is not present on the blacklist.

BRIEF DESCRIPTION OF THE DRAWINGS

Various embodiments of the invention are disclosed in the following detailed description and the accompanying drawings.

FIG. 6 illustrates an example of python kernel code implementing an embodiment of a transformation engine.

FIG. 7 illustrates an example of Java code implementing an embodiment of a transformation engine.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
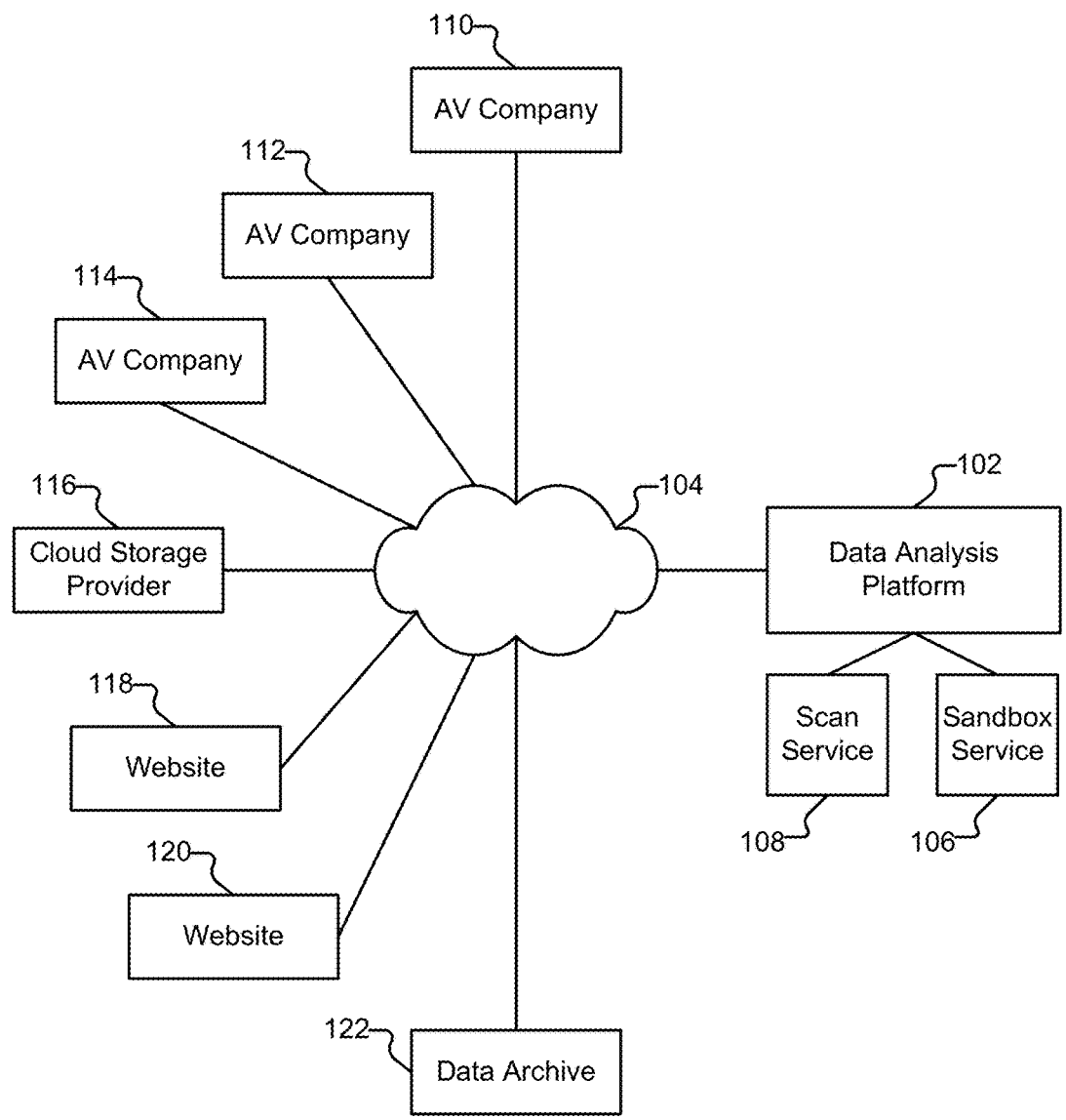
FIG. 1 illustrates an embodiment of an environment in which data is analyzed.

FIG. 1 illustrates an embodiment of an environment in which data is analyzed. An example of data that can be analyzed using techniques described herein is a potentially malicious file (also referred to herein as a "sample"). Such files can take a variety of forms, including Windows executables, Adobe PDFs, etc. Other types of data can also be analyzed using the techniques described herein and the techniques adapted as applicable. In particular, described herein are techniques for clustering similar files by transforming file contents using space-filling curves, down-sampling the transformed result, and performing a hashing operation on the down-sampled result.

Data analysis platform 102 is configured to receive files for analysis from a variety of sources, via one or more networks (depicted collectively in FIG. 1 as network cloud 104). Such files can be pushed to platform 102 and/or pulled by platform 102, as applicable. For example, anti-virus companies (110-114) can each send files to platform 102 for analysis. Examples of such companies include McAfee, Kaspersky, and Sophos. In some embodiments, at least some of the anti-virus companies cooperate with one another to share samples. For example, the companies can participate in a malware exchange. Platform 102 can be a member of the exchange, and can also operate the exchange, as applicable. As will be described in more detail below, platform 102 can make available results of its analysis of malware samples to companies 110-114 (or other entities), such as in a daily digest of newly-observed samples and associated information.

Another source of files is cloud storage provider 116, which can use the services of platform 102 to evaluate the files cloud storage provider 116's customers upload (e.g., in conjunction with the uploading operation, and/or while the files are at rest on cloud storage provider 116's infrastructure). Examples of cloud storage providers include Box.net and Dropbox. Platform 102 can also be configured to collect files from websites, such as websites 118-120 (e.g., by crawling or scraping such websites) or other types of sites (e.g., FTP sites). The identities of the websites can be acquired by platform 102 in a variety of ways, including by platform 102 operating a DNS-based blackhole list, and by receiving the domain identifiers from companies 110-114 (e.g., as part of the malware exchange). As yet another example, platform 102 can be configured to access files stored in data archive 122. One example of data archive 122 is the Internet Archive, accessible at archive.org.

As will be described in more detail below, data analysis platform 102 is configured to perform analysis on the files it receives. Data analysis platform 102 is further configured to provide files to sandbox service 106 and scan service 108 for additional processing and receive reports back from those services. Sandbox service 106 is configured to execute the samples it receives in a sandbox, and observe/record any potentially malicious actions the samples take. An example of a sandbox service 106 is ThreatGRID. Scan service 108 is configured to check samples using a plurality of instrumented antivirus engines. An example of a scan service is VirusTotal. As shown in FIG. 1, services 106 and 108 are operated separately from platform 102. In various embodiments, the functionality can be provided on platform 102 in addition to or instead of using third party service providers.

Platform 102 is illustrated as a single logical device in FIG. 1. Multiple embodiments of platform 102 can exist in the same environment (e.g., with one embodiment collocated with cloud storage provider 116 and/or data archive 122, and one embodiment operating separately and independently). In various embodiments, platform 102 is a scalable, elastic architecture and can comprise several distributed components, including components provided by one or more third parties (and/or components working in conjunction with infrastructure provided by a third party) as applicable. Further, when platform 102 is referred to as performing a task, such as storing data or processing data, it is to be understood that a sub-component or multiple sub-components of platform 102 (whether individually or in cooperation with third party components) may cooperate to perform that task. Similarly, whenever a component of platform 102 is described as performing a task, a subcomponent may perform the task and/or the component may perform the task in conjunction with other components. Components of platform 102 will now be described.

Figure 2:
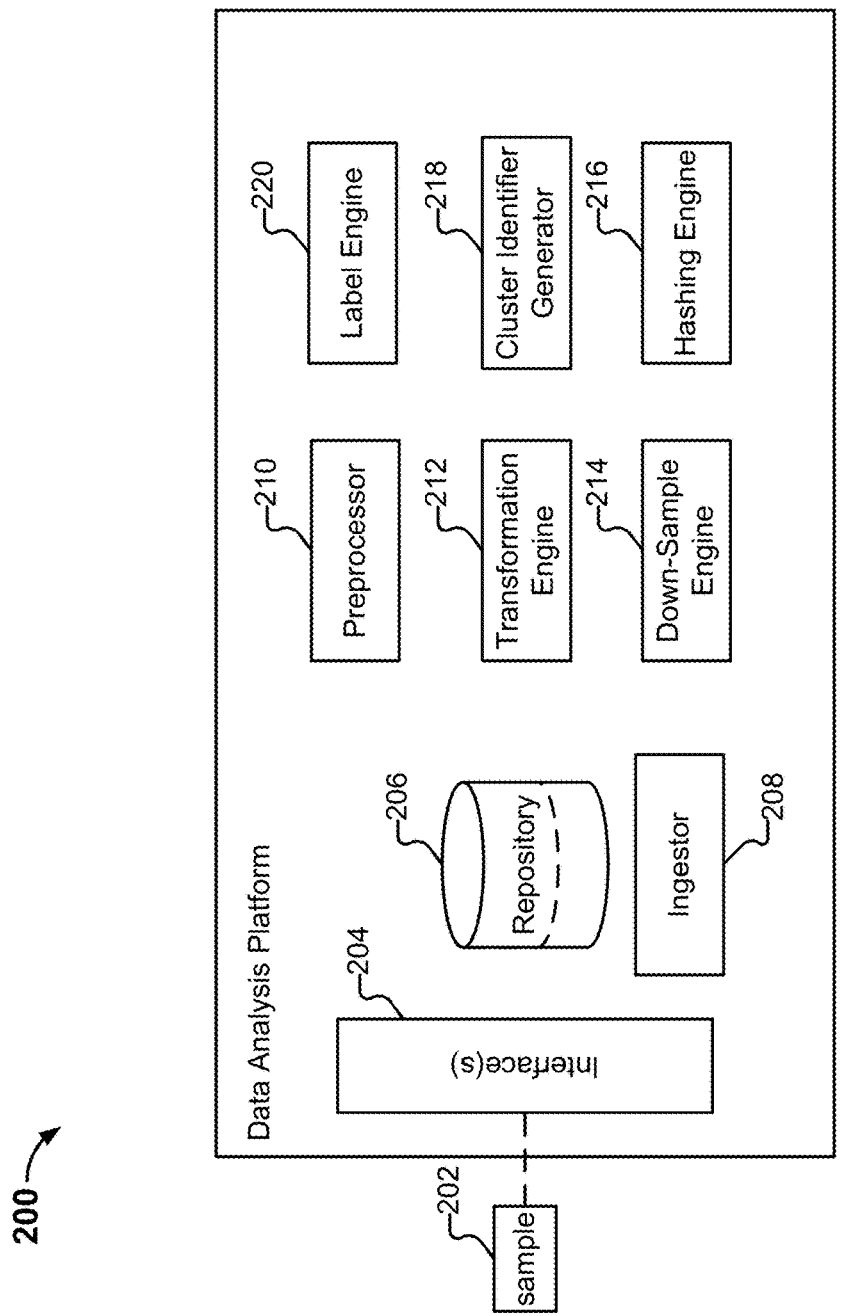
FIG. 2 illustrates an embodiment of a data analysis platform.

FIG. 2 illustrates an embodiment of a data analysis platform. Platform 200 is an embodiment of platform 102. Samples are received for analysis by platform 200 via one or more interfaces 204. As will be described in more detail below, received samples (and information associated with the samples) are stored in repository 206. In various embodiments, repository 206 is made up of multiple databases or other stores. In the example shown in FIG. 2, repository 206 comprises two tiers of storage. The first tier comprises a sharded version of Redis—an open-source, networked, in-memory, key-value data store. Other technologies can also be used, for example, Apache Cassandra can be used instead of Redis. The second tier comprises a clustered file system (CFS). The remaining components of platform 200 will be described in conjunction with the receipt of a sample.

Suppose platform 200 receives a sample 202 having the filename "coolprog.exe" via interface 204 (e.g., obtained from company 110 using SFTP). Further suppose that coolprog.exe is a Windows executable. Ingestor 208 determines whether platform 102 has previously seen the identical sample (and therefore need not process it again) by taking an MD5 (or other appropriate) cryptographic hash of the sample and checking whether that MD5 is present in repository 206 (e.g., by performing a Redis query). Suppose the MD5 for the newly received "coolprog.exe" (e.g., "d6edbcb65a46704450a54fe4ae6b7cdd") is not present in repository 206. Platform 200 stores a copy of sample 202 in repository 206, using the MD5 to reference the file. In some embodiments, additional information associated with the file is also stored in repository 206 (e.g., as metadata), such as the source of the sample, the filename of the sample, etc. The file is then queued (e.g., using a queuing/messaging system such as ZeroMQ) for further processing. In some embodiments, previously-unseen samples (i.e., based on MD5) are dispatched, in parallel, to scan service 108 and/or sandbox service 106. In other embodiments, the sample is dispatched to those services after the processing by platform 102 is complete (and, e.g., a determination has been made by platform 102 that the sample is not closely related to an existing known sample).

Preprocessor 210 is configured to listen for ZeroMQ "advice" that a new sample has arrived in the queue. In some embodiments, preprocessor 210 is a Java program. Preprocessor 210 determines what type of file sample 202 is (e.g., its MIME filetype) and selects an appropriate helper to perform the preprocessing. In this example, sample 202 is a Windows executable, so preprocessor 210 selects a Windows PE helper to extract the PE container from the executable and verify it. Another example of a helper is a PDF helper, configured to extract executable code from PDF files. In some embodiments, if the helper is unable to parse the file (e.g., the PE container is malformed), or if an appropriate helper is not present on platform 102 for the received sample file type, platform 102 is configured to send a copy of the sample to sandbox service 106 for additional analysis (e.g., to see whether sample 202 can be executed by sandbox service 106).

Suppose sample 202 is well-formed (i.e., it can be parsed by preprocessor 210 working in conjunction with a Windows PE helper). Preprocessor 210 is configured to iterate over the data sections of the PE container (which are enumerated in the header) and create a bytestream (e.g., a vector or array of bytes) corresponding to the sample. In this example, one portion of the bytestream corresponds to the program executable code extracted from the PE, another portion of the bytestream corresponds to initialized variables, another portion of the bytestream corresponds to the uninitialized variables, and another portion of the bytestream corresponds to debug data in the linking code, etc. Bytestreams of other types of files can also be constructed by preprocessor 210 working in conjunction with an appropriate helper. In some cases, the code section in a Windows PE may be obfuscated. This obfuscation could be done for purposes of digital rights management, but could also be done by a malware author to make malware analysis more difficult. Such obfuscation does not thwart the processing performed by platform 102, as will be described in more detail below.

Once preprocessor 210 has completed generating a bytestream for sample 202, it provides the bytestream to transformation engine 212, which will transform the bytestream (i.e., from one dimension to two dimensions) using a space-filling curve. One example of a space-filling curve is a Hilbert curve, which is used in various embodiments by transformation engine 212. Other space-filling curves can also be used and the techniques described herein adapted accordingly. Examples of such other space-filling curves include Z-order curves, Peano curves, Moore curves, fractals with a Hausdorff dimension of 2, etc.

One additional task performed by preprocessor 210 (e.g., performed prior to generating a bytestream for sample 202) is to select an order for a Hilbert curve that is of an appropriate size. In particular, preprocessor 210 selects an order that results in a curve size that is larger than the bytestream. In some embodiments, the size decision is further based on a requirement that a minimum amount of negative space be present in the Hilbert curve (e.g., a minimum of fifteen percent negative space). A Hilbert order is $4^n$ (i.e., $2^n$ squared). Preprocessor 210 creates two arrays of the same size in memory—one that will hold the bytestream, and one (initialized to zero) that will hold the bytestream after the transformation using a Hilbert curve (also referred to herein as a "mapping") has been performed.

Figure 3:
FIG. 3 illustrates an example of a graphical representation of a bytestream prior to the application of a Hilbert mapping operation.

A graphical representation of a bytestream is depicted in FIG. 3. In the example shown in FIG. 3, the bytestream has been placed in a square of appropriate size, but the Hilbert mapping has not yet been performed by transformation engine 212. Suppose the received sample that resulted in the bytestream depicted in FIG. 3 is a Windows executable where portions were packed using the UPX packer. The first portion of the bytestream representation (302) corresponds to one packed portion. The second portion of the bytestream representation (304) corresponds to a second packed portion. Note that there are visual differences between the two packed portions. The third portion of the bytestream representation (306) corresponds to a .rsrc file. The remainder of the representation (308) corresponds to empty space.

Figure 4:
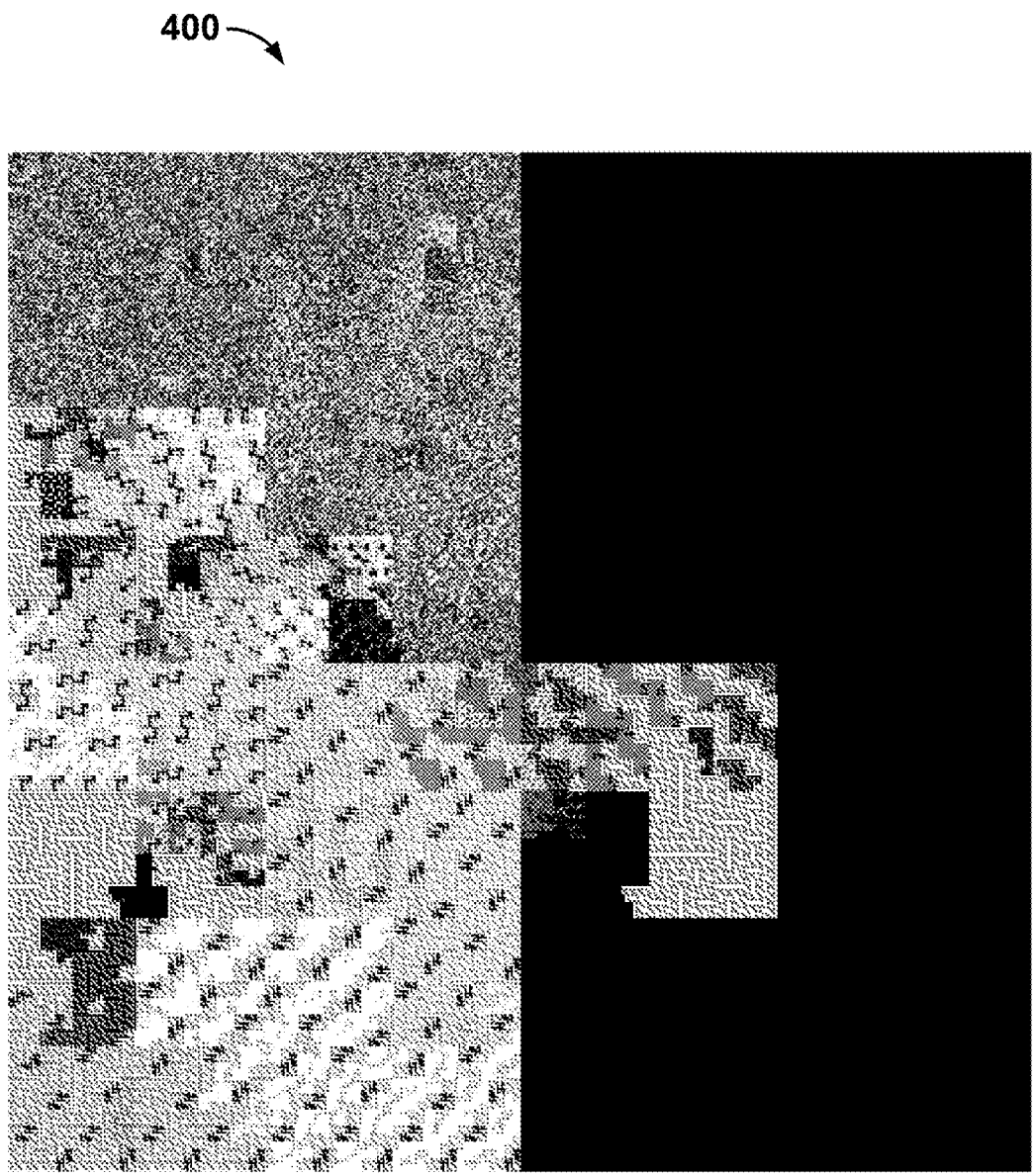
FIG. 4 illustrates an example of a graphical representation of a bytestream after the application of a Hilbert mapping operation.

FIG. 4 illustrates an example of a graphical representation of a bytestream after a Hilbert curve mapping has been applied (e.g., by transformation engine 212). In particular, FIG. 4 depicts the representation shown in FIG. 3 after the mapping has been applied.

Figure 5:
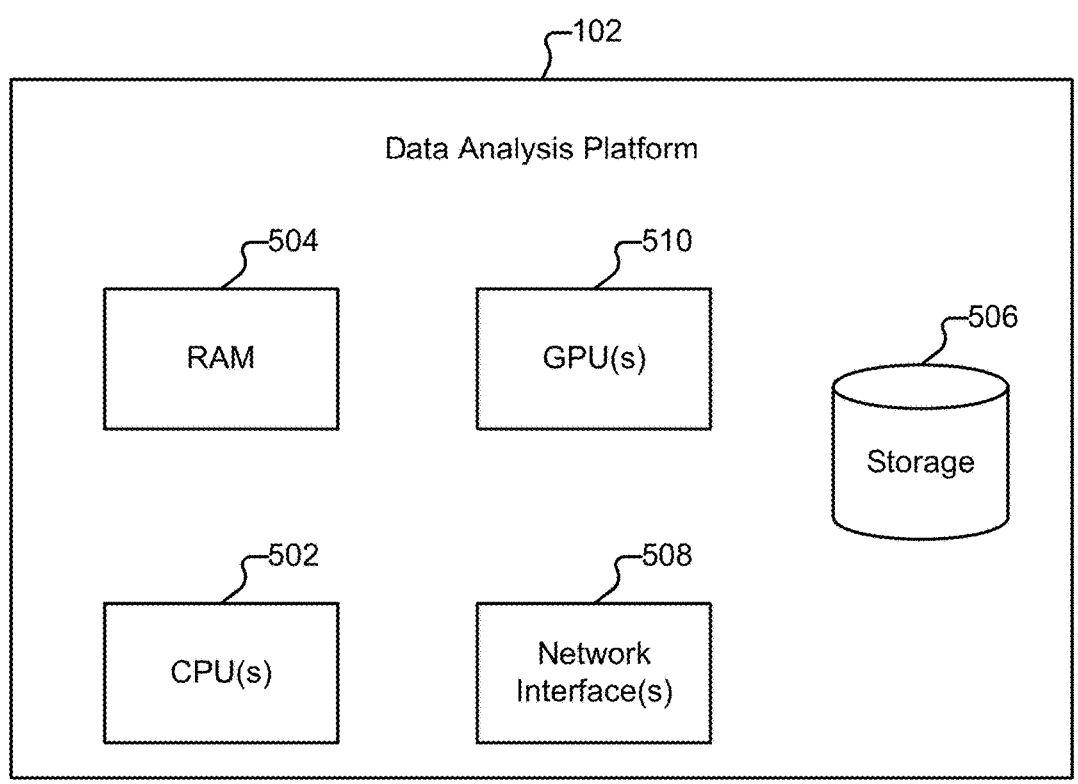
FIG. 5 illustrates an embodiment of a data analysis platform.

FIG. 5 illustrates an embodiment of a data analysis platform. The example shown is a representation of physical components that can be included in various embodiments of platform 102. Specifically, platform 102 includes commodity server-class hardware such as a high performance multi-core CPU 502 and RAM 504 (e.g., 32G of RAM) running a server-class operating system (e.g., Linux-based). Platform 102 also includes a storage 506 (such as one or more solid state disks) and one or more network interfaces 508 (e.g., Gigabit Ethernet). Platform 102 can also include one or more optional hardware accelerators. For example, platform 102 can include one or more graphics processing units (GPUs) 510 which can efficiently perform vector operations such as performing Hilbert curve mapping operations. For example, using typical commodity hardware, a given sample can be analyzed using the techniques described herein on the order of tens or hundreds of milliseconds per core. In various embodiments, platform 102 includes one or more accelerated processing units (APUs) instead of or in addition to having separate CPU(s) 502 and GPU(s) 510. Other accelerators, such as ASICs and FPGAs, can also be used and the techniques described herein adapted as applicable.

In some embodiments, the bytestream data stored in the first array (created by preprocessor 210) is mapped into the second array by transformation engine 212 as follows. The first and second arrays are copied from RAM 504 to GPU 510. In some embodiments, transformation engine 212 is implemented as kernel code, which is written in OpenCL and executed in GPU 510 (or an APU, as applicable). Two examples of kernel code for performing a Hilbert curve mapping are shown in FIGS. 6 and 7, respectively. FIG. 6 shows an example of python kernel code used in some embodiments to implement transformation engine 212. FIG. 7 shows an example of a Java implementation of transformation engine 212 that uses AMD Aparapi, which leverages Java code bytecode into OpenCL.

The mapping function that Hilbert or any other space-filling technique provides is to map an index to a coordinate. In the case of platform 102, a byte in a file is mapped to a 2D coordinate. Where platform 102 includes a GPU (or APU), the maps are calculated using a kernel and GPU (or APU). The maps can also be generated on embodiments of platform 102 that do not include a GPU (or APU), by using an approach such as the following. The maps are different for different sized files, bucketed into $4^n$ size buckets. Fifteen different maps are pre-computed (and, e.g., included with embodiments of transformation engine 212 rather than being computed by transformation engine 212 on initialization). Calculating the size of all maps for Hilbert orders <=15 requires approximately 1.5G of RAM. Once the maps are available, embodiments of CPU 502 can look up from the map/table the coordinate instead of computing the coordinate.

Returning to the descriptions of FIGS. 2 and 5, once transformation engine 212 finishes performing the mapping to a Hilbert curve, the second array (i.e., holding the newly mapped information) is copied back to RAM 504 and the first array (i.e., holding the unmapped bytestream) is discarded. Specifically, the second array (holding the mapped information) is provided to down-sample engine 214.

Figure 8:
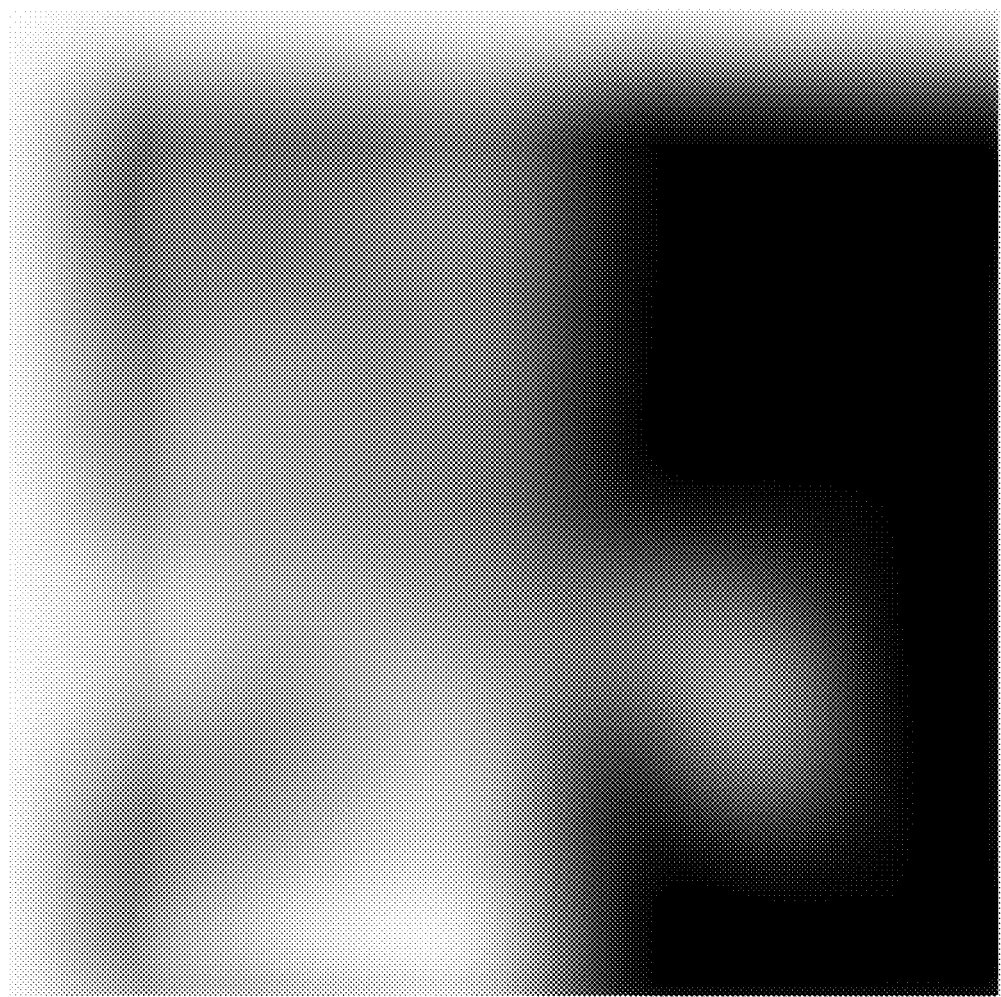
FIG. 8 illustrates an example of data after a blur operation has been performed.

Down-sample engine 214 is configured to reduce the size of the second array while maintaining at least some of its entropy. A variety of approaches can be used. As one example, down-sample engine 214 can perform a blur operation on the contents of the second array. The blur operation can optionally employ anti-aliasing. An example of Hilbert curve 400 after a blur operation has been performed is depicted in FIG. 8. Examples of open source blur engines that can be used by down-sample engine 214 include the Python Imaging Library (PIL), ImageMagick, and Java Development Kit (JDK). In addition to performing a blur operation, down-sample engine 214 is further configured to perform a resize operation. For example, where a Hilbert curve of size 256 is used, the image can be resized to a 16 pixel×16 pixel image (of 256 bit grayscale). Where a Hilbert curve of size 64 is used, the image can be resized to an 8 pixel×8 pixel image (also of 256 bit grayscale). Other dimensions can also be used and the techniques described herein adapted as applicable.

Figure 9:
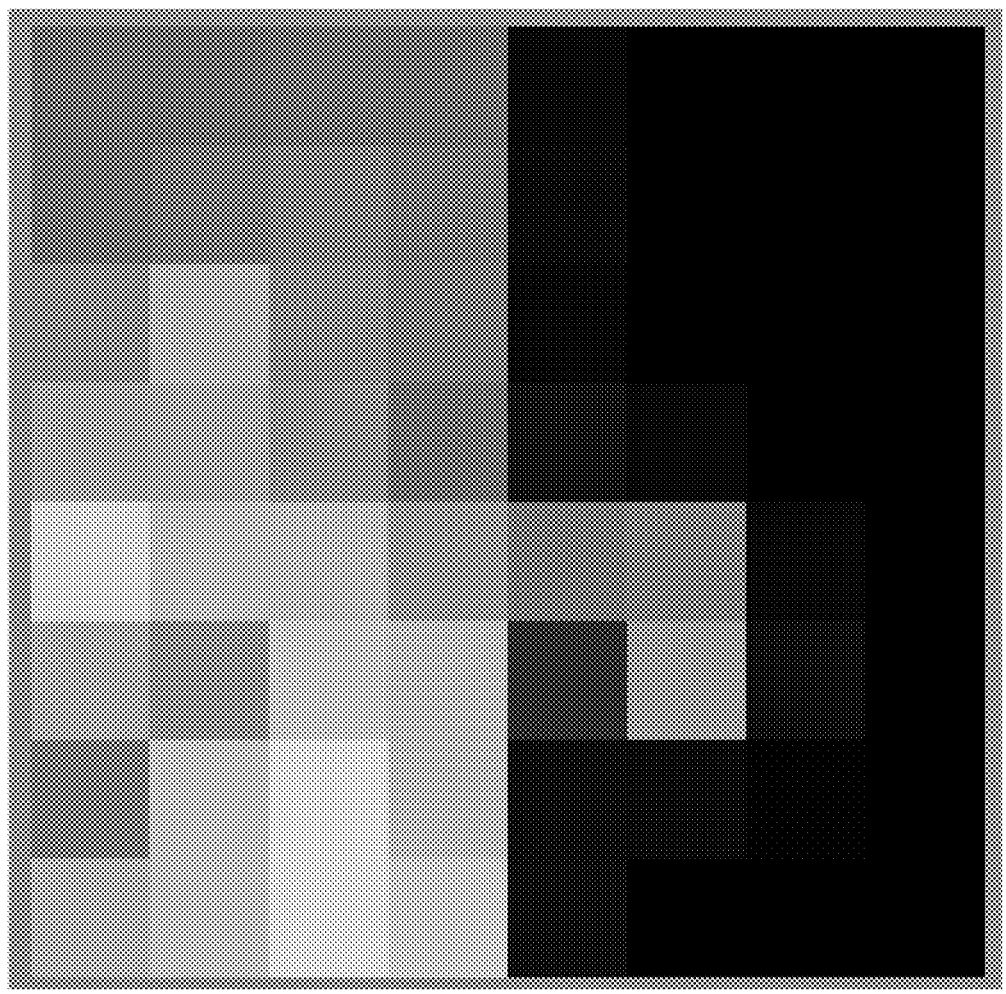
FIG. 9 illustrates an example of data after a resize operation has been performed.

The result of a resize operation having been performed on blur operation output 800 is shown in FIG. 9—a 64 byte image. Image 900 is provided to hashing engine 216 which further reduces the representation of sample 202 while preserving some of its entropy. In particular, in some embodiments, hashing engine 216 performs a locality-sensitive hashing (LSH) operation. As one example, the 64 byte image can be reduced to a 63 bit representation by performing a "less than" comparison using locality sensitive hashing. In particular, byte zero is compared to byte one of image

900. If byte zero is less than byte one, the comparison is "true" and the result is a "1." If byte zero is not less than byte one, the comparison is "false" and the result is a "0." Next, byte one is compared to byte two; byte two is compared to byte three; and so on, until the end of the image is reached. An example of the output of hashing engine 216 that could be generated for image 900 (i.e., using a "less than" in a locality sensitive hashing operation) is: "1000100001000100000101101111101001011000110001010100100000000000." Other operators (or combinations of operators) can also be used in conjunction with the LSH, as applicable (e.g., greater than, removing every n bits, etc.).

In some embodiments, the binary output of hashing engine 216 is in turn provided to cluster identifier generator 218 which converts the result of hashing engine 216 into a hexadecimal string and optionally prefixes it with additional information (i.e., making the identifier more convenient for human use). As one example, the result of hashing image 900 is converted by cluster identifier generator 218 to "884416fa58c5484c." Cluster identifier generator 218 can further refine the output to include information such as the Hilbert order (e.g., "884416fa58c5484c" becomes "h09.884416fa58c5484c"), meaning that every sample that fits in a particular size Hilbert order has its own namespace. In some embodiments, cluster identifier generator 218's processing is omitted, and/or is combined with the processing performed by hashing engine 216.

Cluster identifier generator 218 provides the output of its operation (e.g., "h09.884416fa58c5484c") to label engine 220. Label engine 220 is configured to insert the MD5 of sample 202 into repository 206 using the identifier generated by cluster identifier generator 218. Specifically, in some embodiments, label engine 220 executes an "add to set" (hash set) command, adding the MD5 of sample 202 to the set identified by the key "h09.884416fa58c5484c." If identifier "h09.884416fa58c5484c" is not yet present in repository 206, it will be inserted with the "add to set" operation (and the MD5 of sample 202 included). Additional processing can also be performed. For example, since the sample does not correspond to any existing samples stored in repository 206, the sample can be provided to sandbox service 106 for analysis. In some embodiments, in the event sandbox service 106 already has information about the sample (ascertainable, e.g., by platform 102 sending the MD5 of the sample to sandbox service 106 before sending the sample itself), the sample is not transmitted by platform 102 to 106. Results provided by sandbox service 106 (e.g., a listing of observed malicious behaviors) can be stored in repository 206 as metadata associated with the "h09.884416fa58c5484c" family of malware (that currently has a single member). As another example, a copy of the sample (and/or its MD5) can be sent to scan service 108, which will return information about which (if any) of the scanning engines employed by scan service 108 detect the sample as malicious, and any names given to the sample by such engines. In some embodiments, platform 102 is configured to store (e.g., as metadata), as a human-readable name for the "h09.884416fa58c5484c" identifier, the result of performing a greatest common subsequence on any names received by scan service 108. Other approaches can also be used to select/store human-readable names for samples/clusters of samples, as applicable, such as preferentially using the name provided by one engine over another, concatenating multiple names together (e.g., where different engines use different names), etc.

If the identifier "h09.884416fa58c5484c" is already present in repository 206, this means other samples, having different MD5s but otherwise very similar to sample 202, were previously examined by platform 102 (i.e., part of a cluster of very similar samples). As one example, a malicious developer could change a single pixel of an image included in a sample such as sample 202. An MD5 of the sample with the changed pixel will look vastly different from an MD5 of the sample without the changed pixel, even though the sample is otherwise identical. As will be described in more detail below, such subtle changes will not impact the identifier ultimately generated by cluster identifier generator 218 and so both samples (with and without the changed pixel) will both be considered members of the same cluster of malware (i.e., the "h09.884416fa58c5484c" cluster). If a member of the "h09.884416fa58c5484c" cluster has already been analyzed, then resources can be conserved (i.e., by not sending the changed pixel sample to sandbox service 106, and instead sending to sandbox service 106 only those samples having an associated cluster identifier that was not previously seen). In some embodiments, the sample (or an MD5 of the sample, as applicable) is always sent to at least one of sandbox service 106 and/or scan service 108 (e.g., to augment information already present about the family stored in repository 206).

The contents of repository 206, and in particular recently updated portions thereof, can be provided to entities such as companies 110-114, services 106-108, and/or any other appropriate entities in a variety of ways. As one example, platform 102 can be configured to make available an API that such entities can use to conduct queries (and retrieve results). As another example, platform 102 can make available a daily digest (e.g., packaged as a tar.gz) of newly seen samples and associated information. As one example, suppose a few hundred thousand new samples are received and processed by platform 102 each day. The corresponding digest of results and samples, made available to customers, could comprise approximately 10G of data.

Additional Examples

Figure 10:
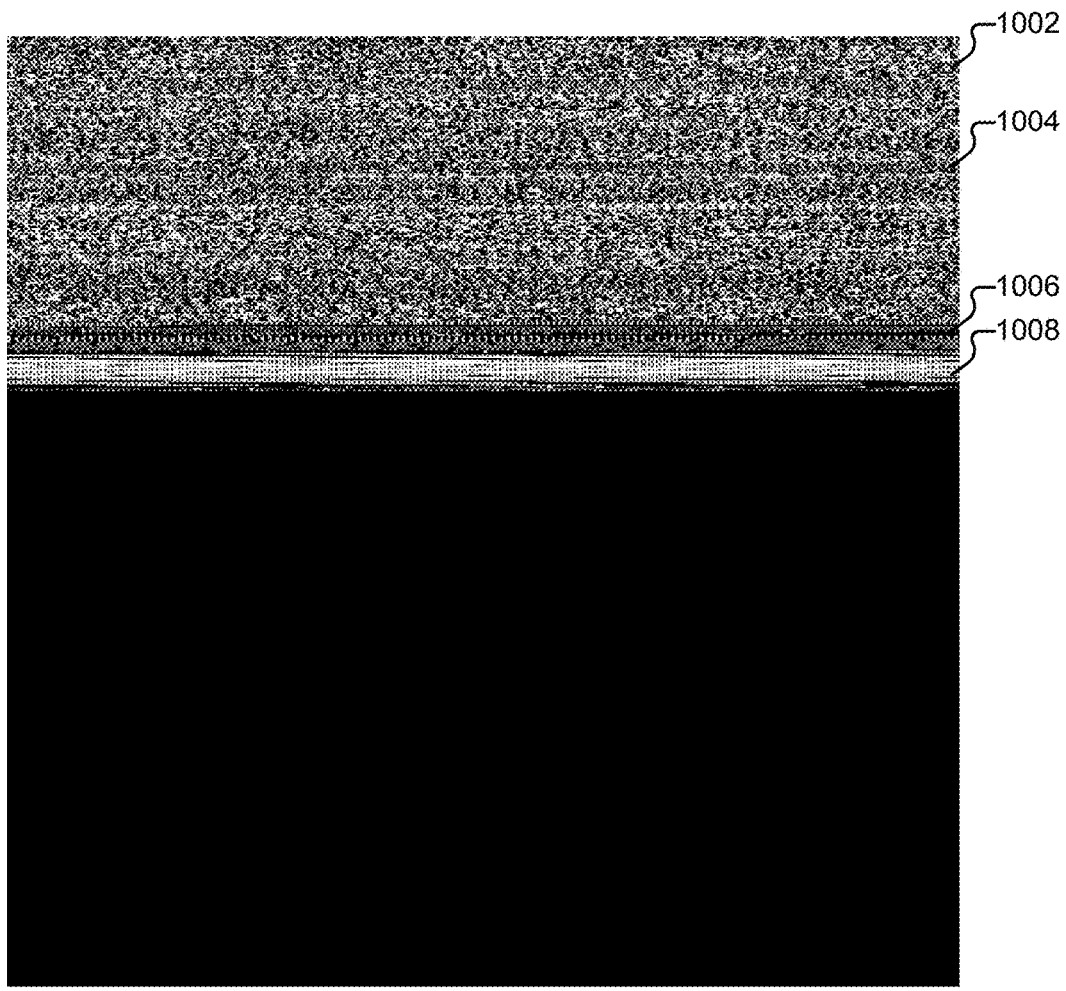
FIG. 10 illustrates a graphical representation of a bytestream.
Figure 11:
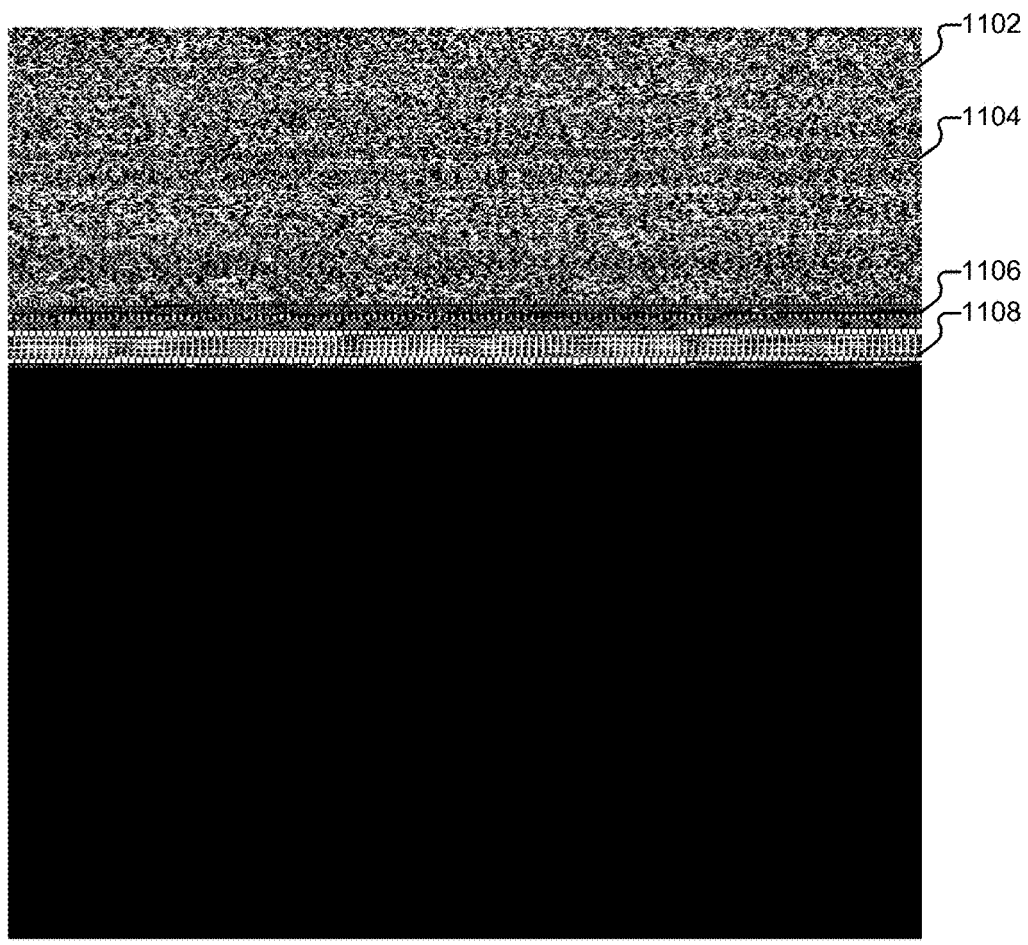
FIG. 11 illustrates a graphical representation of a bytestream.

FIGS. 10 and 11 depict graphical representations of bytestreams associated with two respective samples (similar to the representation shown in FIG. 3). In particular, FIGS. 10 and 11 correspond to samples that have MD5 hashes of "c6cda9e3d865c33afb4a08ff6ea53459" and "fcd40892da915d5edbf76e5c94265c11," respectively. The two samples were authored by the same nefarious individual and perform similar malicious actions (e.g., installing a keystroke logger). The nefarious individual attempted to conceal that the samples are in essence the same, by making slight differences to the second sample.

Regions 1002 and 1102 of the respective bytestream representations comprise ".text" data. Regions 1004 and 1104 of the respective bytestream representations comprise ".data" data. Regions 1006 and 1106 of the respective bytestream representations comprise ".idata" data. Regions 1008 and 1108 of the respective bytestream representations comprise ".rsrc" data. The remainder of the bytestream representations correspond to empty space.

Figure 12:
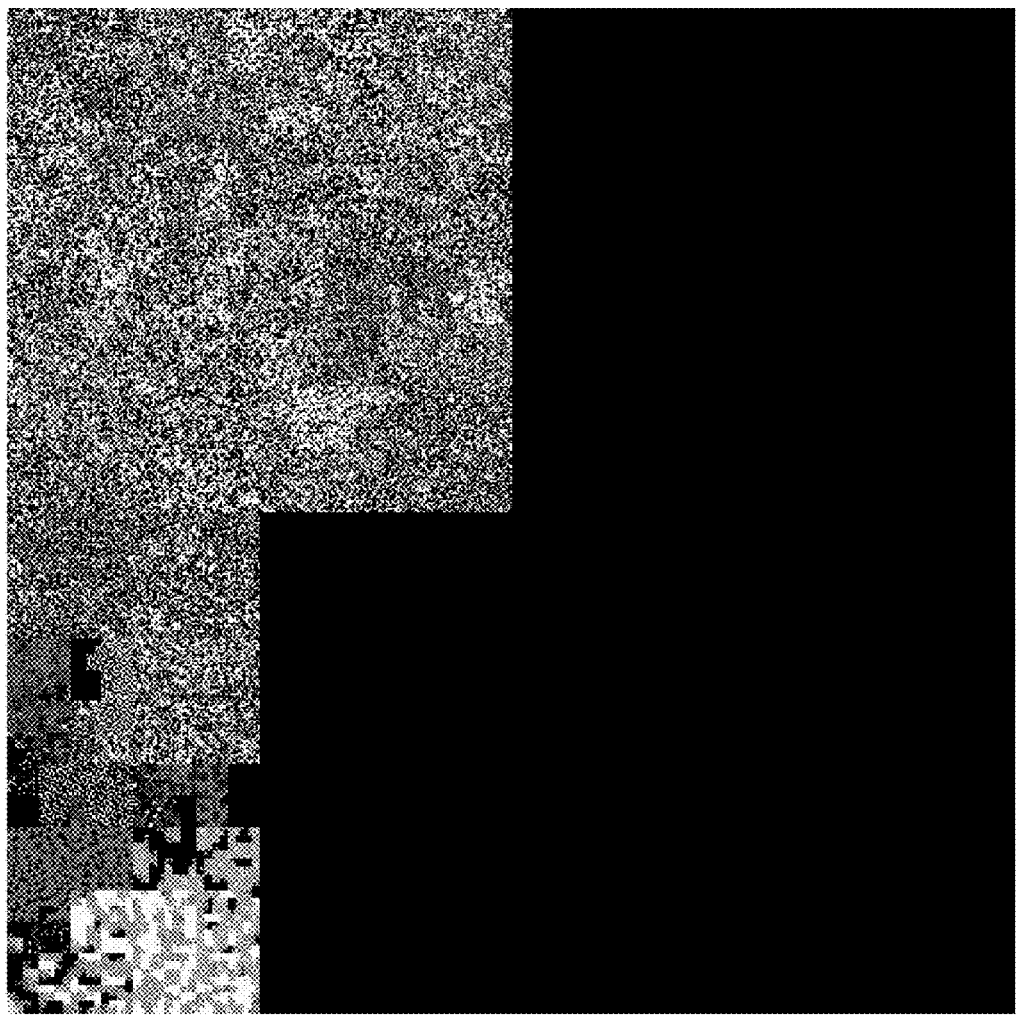
FIG. 12 illustrates a graphical representation of a result of a Hilbert curve mapping operation.
Figure 13:
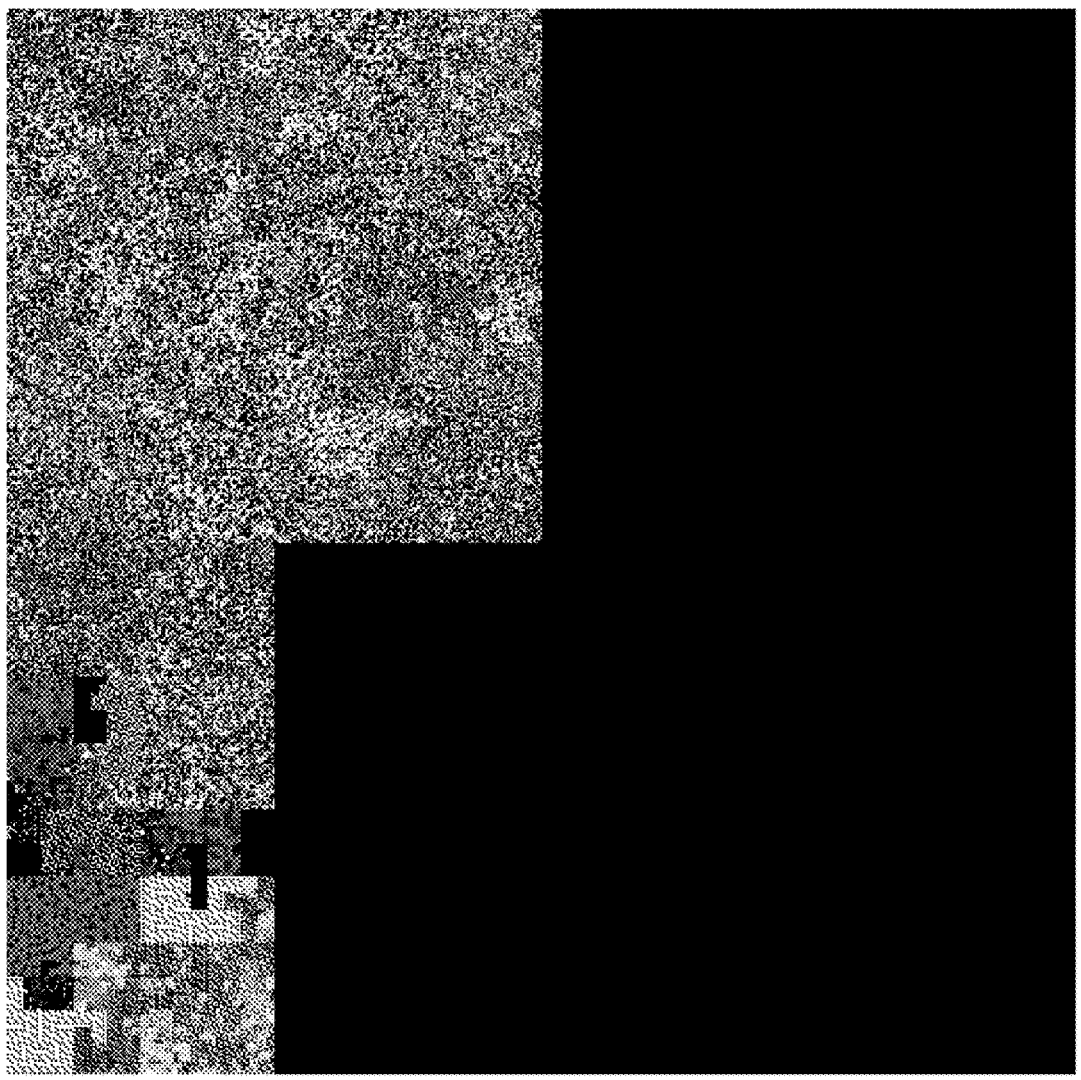
FIG. 13 illustrates a graphical representation of a result of a Hilbert curve mapping operation.
Figure 14B:
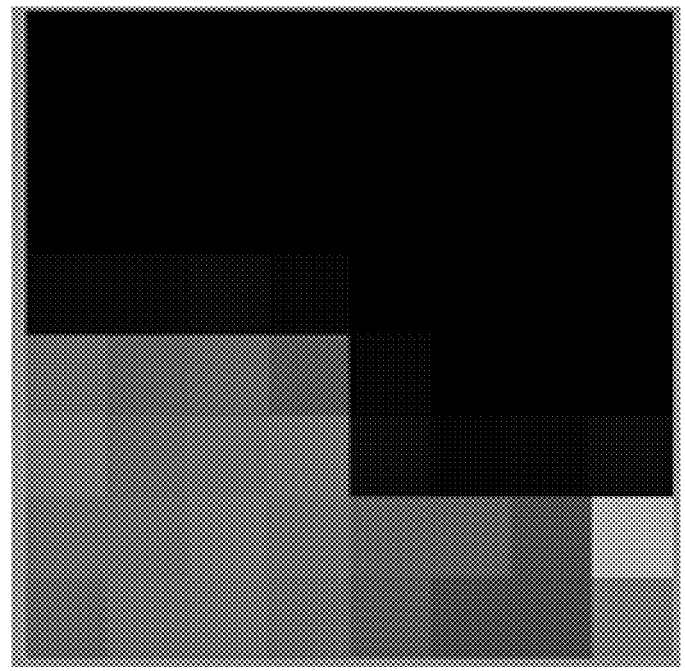
FIG. 14B illustrates pixel data.
Figure 14A:
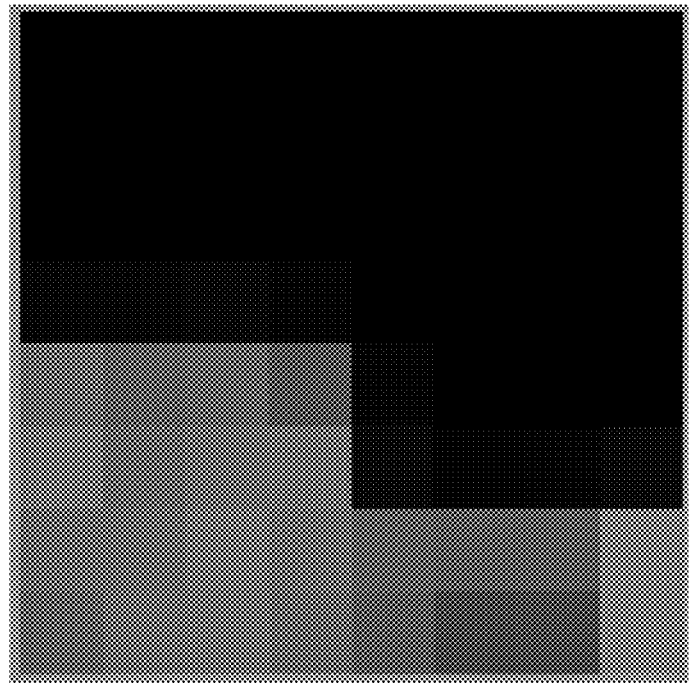
FIG. 14A illustrates pixel data.

FIGS. 12 and 13 depict graphical representations of bytestreams after a Hilbert curve mapping has been applied (e.g., by transformation engine 212) to the data shown in FIGS. 10 and 11, respectively. Samples "c6cda9e3d865c33afb4a08ff6ea53459" and "fcd40892da915d5edbf76e5c94265c11" have very different MD5 hashes, and have very similar but not identical pixel data (as seen in FIGS. 14A and 14B). However, when hashing engine 216 performs a locality-sensitive hashing operation (e.g., using "less than") on 1402 and 1404 respectively, however, identical output will be obtained: "11000100110100001001100100010101010000110000000 01000100000000000." Cluster identifier generator 218 will therefore convert the result of hashing engine 216 into identical strings for both samples: "h09.c4d099154300880c." Accordingly, both samples will be added to the same cluster, "h09.c4d099154300880c," within repository 206, despite the very different MD5 hashes of the two samples.

Example Process

Figure 15:
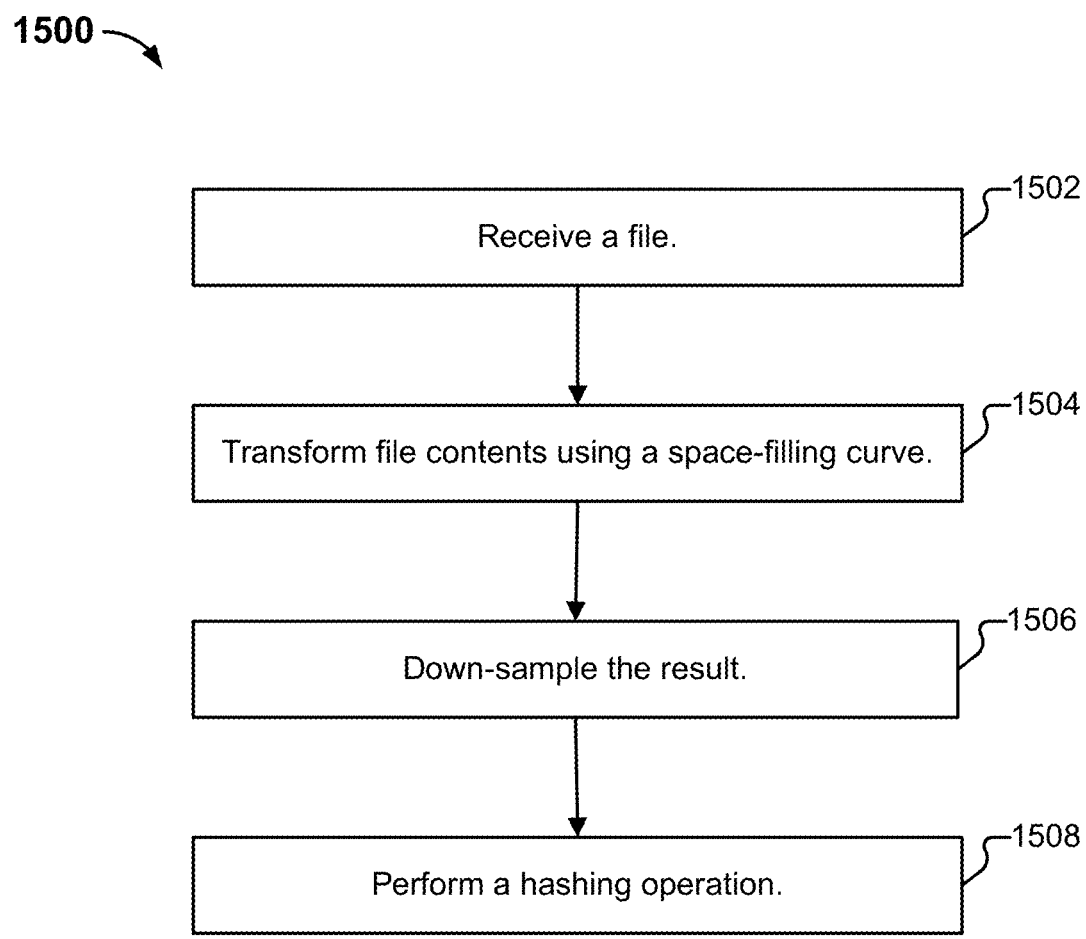
FIG. 15 illustrates an embodiment of a process for analyzing data.

FIG. 15 illustrates an embodiment of a process for analyzing data. In various embodiments, process 1500 is performed by platform 102. The process begins at 1502 when a file is received. As one example, a file is received at 1502 when sample 202 is received by platform 102 (e.g., via an embodiment of interface 204). At 1504, file contents are transformed using a space-filling curve (e.g., by transformation engine 212). As explained above, additional processing can be performed after receipt of a file and prior to the transformation occurring. For example, preprocessor 210 can perform preprocessing on sample 202, resulting in a first array of bytes. Also, decisions such as what order Hilbert curve to use, and what down-sample size should be used can be made. At 1506, the result of the space-filling curve transformation is down-sampled. As one example, down-sampling can be performed by down-sample engine 214 which is configured to perform a blur operation (with anti-aliasing) and resize operation on the result of the space-filling curve transformation. Finally, at 1508, a hashing operation is performed. As one example, at 1508, hashing engine 216 performs an LSH hashing operation on the down-sampled result. As explained above, additional processing can also be performed in conjunction with process 1500, such as sending the sample to services such as 106 and 108, and associating the sample with the result of the LSH hash (or a representation thereof) in a repository.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
  an interface configured to receive a file;
  a processor configured to:
    select a size for a Hilbert curve based at least in part on a size of the received file;
    transform file contents using the Hilbert curve;
    down-sample the transformed file contents; and
    perform a hashing operation on the down-sampled result; and
  a memory coupled to the processor and configured to provide the processor with instructions.

2. The system of claim 1 wherein transforming the file contents includes performing a pre-processing operation.

3. The system of claim 1 wherein transforming the file contents includes generating a bytestream.

4. The system of claim 1 wherein the processor is further configured to select the size for the Hilbert curve based at least in part on a determination of a threshold amount of negative space to be included in the curve.

5. The system of claim 1 wherein the processor is further configured to generate a cryptographic hash associated with the received file.

6. The system of claim 1 wherein down-sampling the transformed file contents includes performing a blur operation.

7. The system of claim 1 wherein down-sampling the transformed file contents includes performing an anti-aliasing operation.

8. The system of claim 1 wherein down-sampling the transformed file contents includes performing a resize operation.

9. The system of claim 1 wherein performing the hashing operation includes performing locality sensitive hashing.

10. A method, comprising:
  receiving a file;
  selecting a size for a Hilbert curve based at least in part on a size of the received file;
  transforming file contents using the Hilbert curve;
  down-sampling the transformed file contents; and
  performing a hashing operation on the down-sampled result.

11. The method of claim 10 wherein transforming the file contents includes performing a pre-processing operation.

12. The method of claim 10 wherein transforming the file contents includes generating a bytestream.

13. The method of claim 10 further comprising selecting the size for the Hilbert curve based at least in part on a determination of a threshold amount of negative space to be included in the curve.

14. The method of claim 10 wherein down-sampling the transformed file contents includes performing a blur operation.

15. The method of claim 10 wherein performing the hashing operation includes performing locality sensitive hashing.

16. A computer program product embodied in a non-transitory tangible computer readable storage medium and comprising computer instructions for:
  receiving a file;
  selecting a size for a Hilbert curve based at least in part on a size of the received file;
  transforming file contents using the Hilbert curve;
  down-sampling the transformed file contents; and
  performing a hashing operation on the down-sampled result.

17. The method of claim 10 further comprising generating a cryptographic hash associated with the received file.

18. The method of claim 10 wherein down-sampling the transformed file contents includes performing an anti-aliasing operation.

19. The method of claim 10 wherein down-sampling the transformed file contents includes performing a resize operation.

20. The computer program product of claim 16 further comprising computer instructions for selecting the size for the Hilbert curve based at least in part on a determination of a threshold amount of negative space to be included in the curve.

* * * * *